US 12,099,727 B2

(12) United States Patent
Lee et al.

(10) Patent No.: US 12,099,727 B2
(45) Date of Patent: Sep. 24, 2024

(54) MEMORY SYSTEM AND METHOD FOR OPERATING THE SAME

(71) Applicant: SK hynix Inc., Gyeonggi-do (KR)

(72) Inventors: Dong Kyu Lee, Gyeonggi-do (KR);
Seung Geol Baek, Gyeonggi-do (KR);
Jae Hyun Yoo, Gyeonggi-do (KR);
Seon Ju Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 130 days.

(21) Appl. No.: 17/882,112

(22) Filed: Aug. 5, 2022

(65) Prior Publication Data

US 2023/0297253 A1 Sep. 21, 2023

(30) Foreign Application Priority Data

Mar. 16, 2022 (KR) ........................ 10-2022-0032713

(51) Int. Cl.
*G06F 3/06* (2006.01)

(52) U.S. Cl.
CPC ............ *G06F 3/0625* (2013.01); *G06F 3/064* (2013.01); *G06F 3/0679* (2013.01)

(58) Field of Classification Search
CPC ....... G06F 3/0625; G06F 3/064; G06F 3/0679
See application file for complete search history.

(56) References Cited

U.S. PATENT DOCUMENTS

| 2021/0182166 A1* | 6/2021 | Hahn ................. G06F 11/3034 |
| 2022/0156000 A1* | 5/2022 | Inbar .................... G06F 3/0658 |
| 2022/0391089 A1* | 12/2022 | Muthiah .............. G06F 3/0659 |
| 2023/0103355 A1* | 4/2023 | Surianarayanan ...... G06F 3/064 |
| | | 711/158 |
| 2023/0168826 A1* | 6/2023 | Agarwal .............. G06F 3/0679 |
| | | 711/154 |

FOREIGN PATENT DOCUMENTS

| KR | 10-2012-0097862 A | 9/2012 |
| KR | 10-1581858 B1 | 1/2016 |

* cited by examiner

*Primary Examiner* — Eric T Oberly
(74) *Attorney, Agent, or Firm* — IP & T GROUP LLP

(57) ABSTRACT

A memory system may include a memory device including a plurality of memory areas each configured by a plurality of memory blocks; and a memory controller configured to generate zones each including at least one memory block selected from at least one of the memory areas included in the memory device, manage configuration information for each generated zone, sequentially store data from a first storage location of an open zone among the generated zones during a write operation on the open zone according to an external request, and determine a number of active target memory areas associated with the open zone on a basis of configuration information of the open zone.

10 Claims, 9 Drawing Sheets

MEMORY SYSTEM AND METHOD FOR OPERATING THE SAME

CROSS-REFERENCES TO RELATED APPLICATION

The present application claims priority under 35 U.S.C., § 119(a) to Korean patent application number 10-2022-0032713, filed on Mar. 16, 2022, which is incorporated herein by reference in its entirety.

BACKGROUND

1. Technical Field

The present technology relates to a semiconductor integrated apparatus, and more particularly, to a memory system and a method for operating the same.

2. Related Art

A memory system performs a data input/output operation in response to an external request by using a memory device as a storage medium.

A memory system may adopt various storage media, and may use, for example, a nonvolatile memory device, such as a flash memory device, as a storage medium.

A memory system may simultaneously access a plurality of storage areas constituting a storage medium and respond to an external request with high performance. However, performance improvement of a memory system may cause an increase in power consumption and an increase in temperature due to the increase in power consumption.

Accordingly, it is necessary to control the performance or power consumption of a memory system adaptively to an environment of the memory system and a computing system to which the memory system is applied.

SUMMARY

A memory system in accordance with an embodiment of the present technology may include: a memory device including a plurality of memory areas each configured by a plurality of memory blocks; and a memory controller configured to generate zones each including at least one memory block selected from at least one of the memory areas included in the memory device, manage configuration information for each generated zone, sequentially store data from a first storage location of an open zone among the generated zones during a write operation on the open zone according to an external request, and determine a number of active target memory areas associated with the open zone on a basis of configuration information of the open zone.

A memory system in accordance with an embodiment of the present technology may include: a memory device including a plurality of memory dies each including a plurality of memory blocks; and a memory controller configured to generate a zone by grouping the memory blocks selected from at least one of the memory dies included in the memory device, write, according to an external write request, data into an open zone, to which a write buffer is allocated, by simultaneously accessing memory dies associated with the open zone, and determine a number of active target memory dies associated with the open zone on a basis of a number of the memory dies associated with the open zone.

A method for operating a memory system in accordance with an embodiment of the present technology may include: generating zones by grouping memory blocks selected from at least one of memory areas each configured by a plurality of memory blocks included in a memory device; managing configuration information for each of the generated zones; and determining a number of active target memory areas associated with an open zone on a basis of the configuration information of the open zone in order to perform a write operation on the open zone according to an external write request.

A method for operating a memory system in accordance with an embodiment of the present technology may include: mapping each zone with one or more of total memory dies; and accessing a number of memory dies, which are selected from the memory dies mapped with a selected zone, according to an interleaving scheme. Wherein the number is expressed by an equation $A=B*(C/D)$, where: 'A' represents the number, 'B' represents a predetermined number of memory dies, which can become active among the memory dies, 'C' represents a number of memory dies, which are mapped with the selected zone and one or more open zones, and 'D' represents a number of the total memory dies.

DETAILED DESCRIPTION

Hereinafter, embodiments of the present technology Will be described in more detail with reference to the accompanying drawings.

Figure 1:
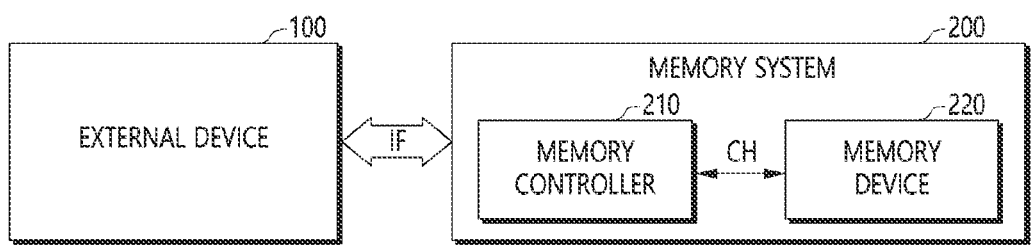
FIG. 1 is a configuration diagram of an electronic device in accordance with an embodiment of the present disclosure.

FIG. 1 is a configuration diagram of an electronic device 10 in accordance with an embodiment of the present disclosure.

Referring to FIG. 1, the electronic device 10 in accordance with an embodiment may include a memory system 200 that performs data exchange with the outside. In the following description, the "outside" may be an external device 100, and the electronic device 10 may include, for example, a host device to which the memory system is connected.

The external device 100 and the memory system 200 may be connected through an interface IF. The IF may provide a physical connection between the external device 100 and the memory system 200.

The memory system 200 may include a memory controller 210 and a memory device 220.

The memory controller 210 may control the memory device 220 in response to a request of the external device 100. For example, the memory controller 210 may allow data to be programmed in the memory device 220 according to a write request of the external device 100. Furthermore, the memory controller 210 may provide data written in the memory device 220 to the external device 100 in response to a read request of the external device 100.

The memory device 220 may write data or output the written data through at least one channel CH in response to a command and/or data transmitted from the memory controller 210. The memory device 220 may be configured as a volatile or a nonvolatile memory device. In an embodiment, the memory device 220 may be implemented using a memory element selected from various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM). The memory device 220 may include a plurality of dies, a plurality of chips, or a plurality of packages. In addition, the memory device 220 may operate as a single-level cell that stores one-bit data in one memory cell or a multi-level cell that stores multiple bits of data in one memory cell.

Although not illustrated, the memory system 200 may further include a buffer memory. The buffer memory serves as a space capable of temporarily storing data when the memory system 200 performs a series of operations such as writing or reading data in cooperation with the external device 100, The buffer memory may be provided outside or inside the memory controller 210, or may be allocated as a part of the memory device 220.

Figure 2:
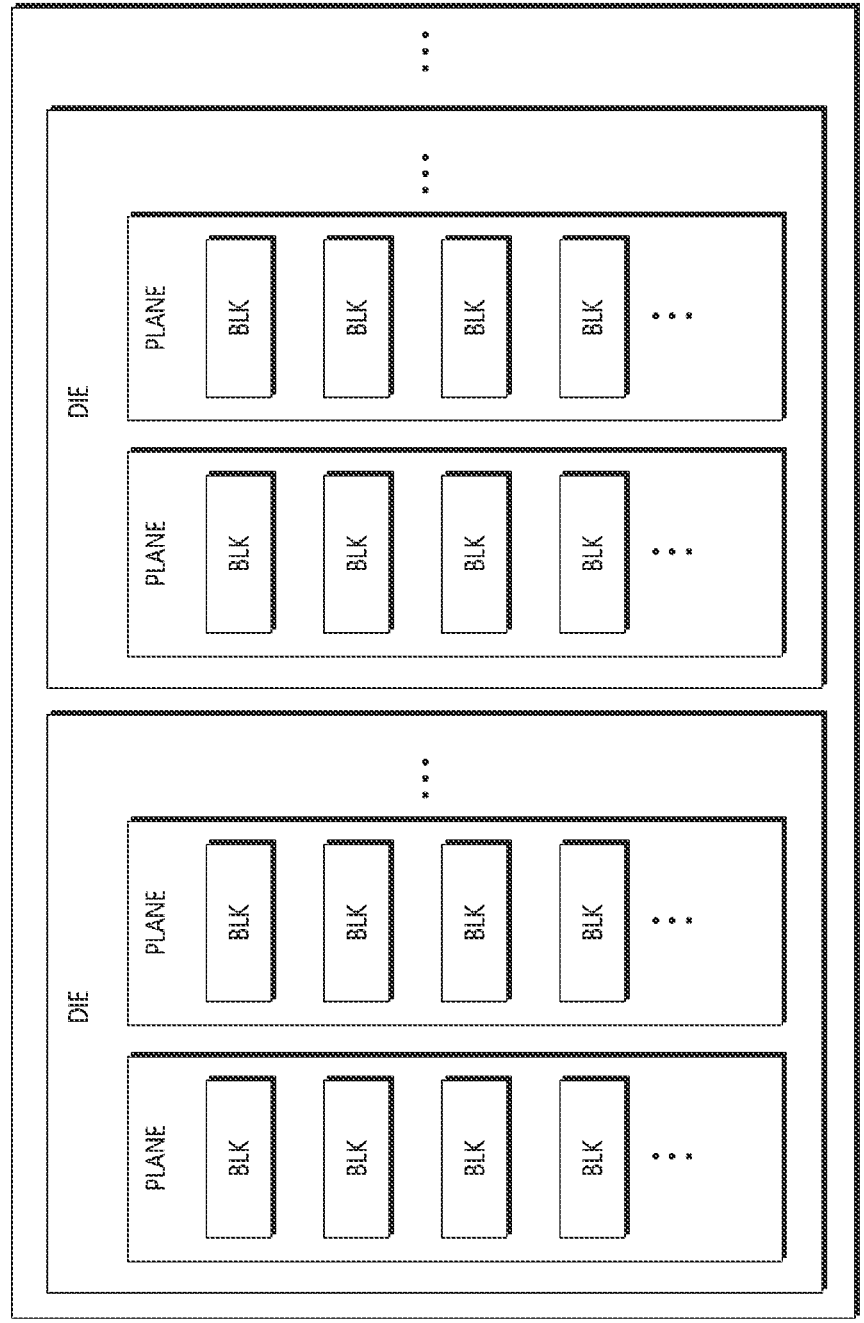
FIG. 2 is a configuration diagram of a memory device in accordance with an embodiment of the present disclosure.

FIG. 2 is a configuration diagram of the memory device 220 in accordance with an embodiment of the present disclosure.

Referring to FIG. 2, the memory device 220 may include a plurality of memory areas, for example, memory dies DIE.

Each of the plurality of memory dies DIE may include one or more planes PLANE, and each of the planes PLANE may include one or more memory blocks BLK, Although not illustrated, each of the memory blocks BLK may include a plurality of pages.

The memory controller 210 may group the plurality of memory blocks BLK selected from the plurality of memory dies DIE to form a block group referred to as a super block (SB) or a zoned name space (ZNS).

Figure 3:
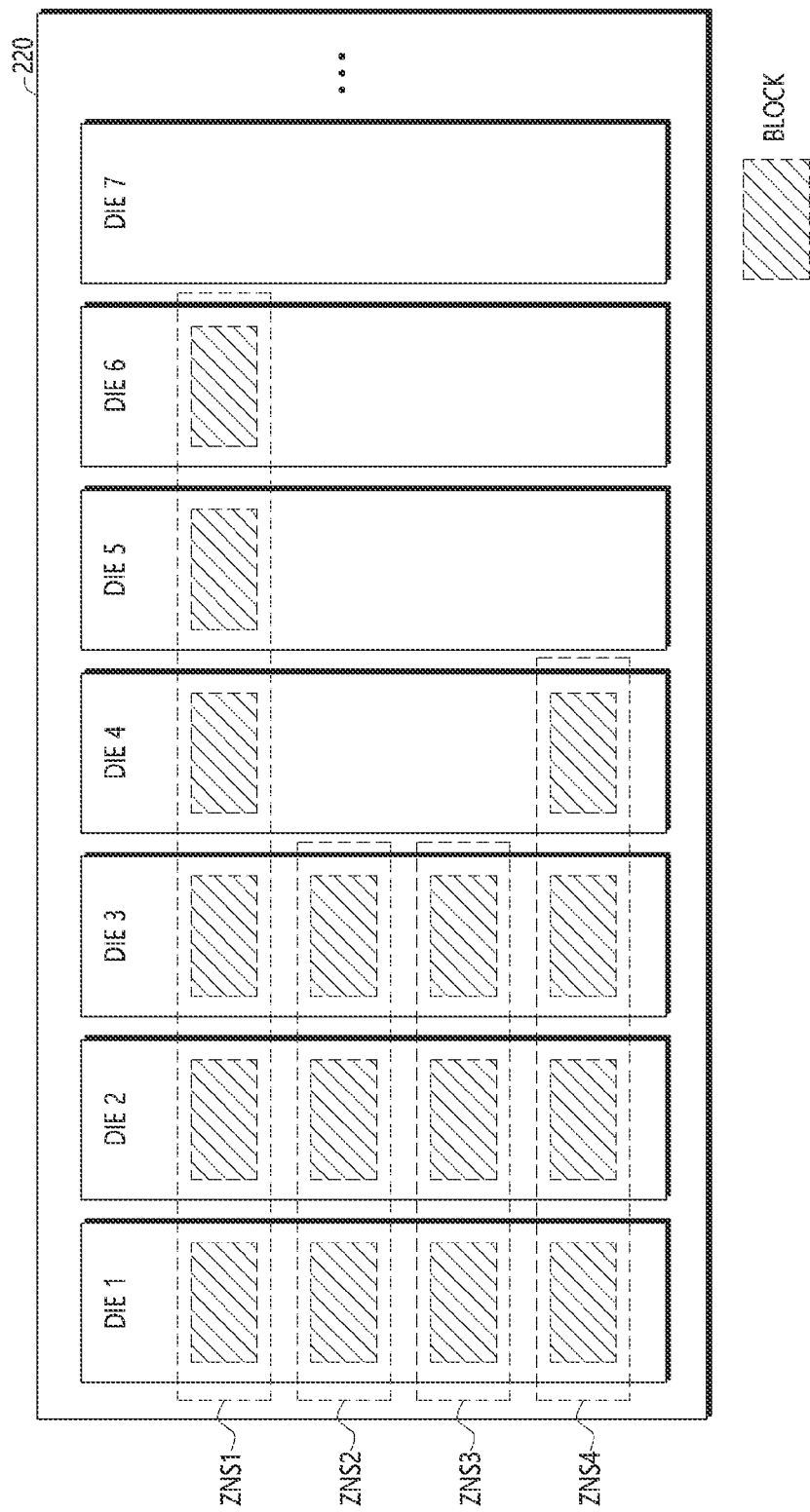
FIG. 3 is a diagram for describing the concept of a zoned name space in accordance with an embodiment of the present disclosure.

The block group is obtained by logically grouping the plurality of memory blocks BLK included in the memory device 220, and the memory blocks BLK included in the block group may be simultaneously accessed by an interleaving method, FIG. 3 is a diagram for describing the concept of the zoned name space in accordance with an embodiment of the present disclosure.

In the following description, the zoned name space may be referred to as "ZNS" or "zone".

The ZNS has been introduced to provide high performance between a plurality of operating systems and a plurality of application programs without interference in a data center of a multi-tenant environment.

The memory controller 210 may operate the memory device 220 so that each of the plurality of application programs sequentially stores data in a zone allocated to each of the plurality of application programs.

The zone may be a logically and physically separated memory area. Each of the application programs may sequentially store data in a zone allocated to each of the application programs. Accordingly, it is possible to solve performance degradation due to garbage collection occurring in managing a memory device configured as a nonvolatile memory device.

Referring to FIG. 3, the memory controller 210 may group memory blocks selected from a plurality of dies DIE1, DIE2, DIE3, DIE4, DIE5, DIE5, DIE7, in response to a write request from a host, and manage the grouped memory blocks as zones ZNS1 to ZNS4. The zones ZNS1 to ZNS4 may be generated with substantially the same size or different sizes for each application program that provides write data.

In an embodiment, a first zone ZNS1 may include memory blocks selected from first to sixth dies DIE1 to DIE6. Each of a second zone ZNS2 and a third zone ZNS3 may include memory blocks selected from the first to third dies DIE1 to DIE3. A fourth zone ZNS4 may include memory blocks selected from the first to fourth dies DIE1 to DIE4.

The memory blocks included in each of the zones ZNS1 to ZNS4 may be simultaneously accessed by a die interleaving or channel interleaving method. For example, in order to operate the memory device 220 by a die interleaving method, the memory controller 210 may select memory blocks having substantially the same or different offsets from each plane PLANE of each the DIE to form the zones ZNS1 to ZNS4.

Figure 4:
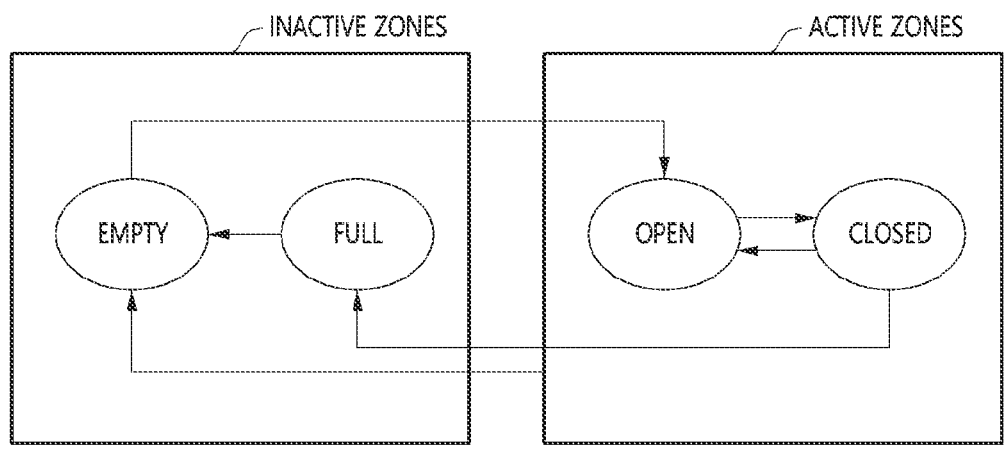
FIG. 4 is a diagram for describing the state of a zone in accordance with an embodiment of the present disclosure.

FIG. 4 is a diagram for describing the state of a zone in accordance with an embodiment of the present disclosure.

The state of a zone generated according to a request of the external device 100 may be divided into active zones ACTIVE ZONES and inactive zones INACTIVE ZONES as illustrated in FIG. 4.

Zones included in the active zones may include open zones OPEN in an open state and/or dosed zones CLOSED in a dosed state. Zones included in the inactive zones INACTIVE ZONES may include empty zones EMPTY in an empty state and/or full zones FULL in a full state.

In order to write data in a zone, the memory controller 210 may allocate a part of a buffer memory as a write buffer for each write target zone. The open zone OPEN may refer to a zone selected for performing a write operation, that is, a zone to which an area of a write buffer is allocated, and the memory system 200 may perform a program operation on a memory block included in the open zone OPEN.

When a program command for a zone other than an open zone OPEN is generated in a state in which all areas of the write buffer are allocated to the open zone OPEN, the memory controller 210 may switch at least one of the open zones OPEN to a closed zone CLOSED. That is, the closed zone CLOSED may be switched from the open zone OPEN.

When data are all programed in all pages of a memory block corresponding to an open zone OPEN, the memory controller 210 switches the open zone OPEN to a dosed zone CLOSED and then switches the dosed zone CLOSED to a full zone FULL, The full zone FULL refers to a zone in which data are written in all pages within a corresponding memory block. When an application program, that is, the external device 100 provides the memory system 200 with an erase command for a full zone FULL or active zones ACTIVE ZONES, the memory system 200 erases a corresponding full zone FULL and the memory controller 210 switches the full zone FULL to an empty zone EMPTY, The empty zone EMPTY refers to a zone in which a corresponding memory block is an empty memory block.

The memory system 200 may simultaneously access a plurality of dies mapped to a zone to write data therein, read data therefrom or erase data therefrom according to a die interleaving method, thereby improving the performance of the memory system 200. The performance improvement of the memory system 200 causes an increase in power consumption and heat generation due to the increase in power consumption. Accordingly, the memory system 200 may simultaneously access the optimum number of active dies mapped to a zone. In a normal mode, the optimum number of active dies may be a predefined maximum number of active dies, that is, the maximum number of allowed active dies. In an embodiment, the active die refers to a die selected by a die address included in an active command in order to process a command for a zone.

optimum number of active dies (normal mode)
=maximum number of allowed active dies    [Equation 1]

On the other hand, in a throttling mode in which the temperature of the memory system 200 increases above a threshold value and thermal throttling is required, die management policy may be used to limit the optimum number of active dies to less than the maximum number of allowed active dies.

In a ZNS environment in which data is stored by allowing to zones having substantially the same size or different sizes for each application program, the number of dies to be switched to an active state may vary depending on how an open zone is configured. Accordingly, in a case where the memory system 200 operates based on the ZNS and is not in the throttling mode, when the maximum number of allowed active dies mapped to a zone can be limited to the optimum number of active dies mapped to a zone, power may be unnecessarily consumed.

In the present technology, it is possible to reduce power consumption of the electronic device 10 in addition to the memory system 200 by dynamically determining the optimum number of active dies mapped to an open zone according to the number of dies associated with the open zone, that is, the number of dies mapped to the open zone.

Figure 5:
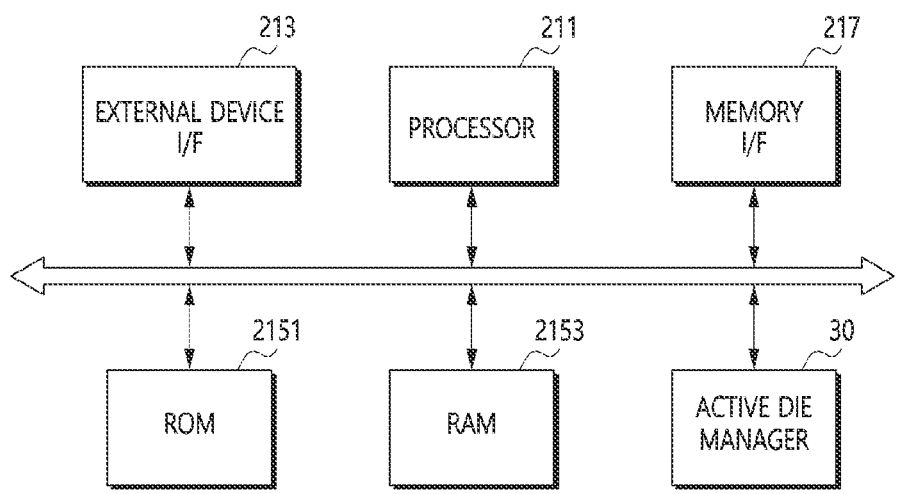
FIG. 5 is a configuration diagram of a memory controller in accordance with an embodiment of the present disclosure.

FIG. 5 is a configuration diagram of the memory controller 210 in accordance with an embodiment of the present disclosure.

Referring to FIG. 5, the memory controller 210 in accordance with an embodiment may include a processor 211, an external device interface EXTERNAL DEVICE IF 213, a ROM 2151, a RAM 2153, a memory interface MEMORY IF 217, and an active die manager 30.

The processor 211 may be configured to transfer various types of control information required for a read or write operation of data on the memory device 220 to the external device IF 213, the RAM 2153, the memory IF 217, and the active die manager 30, In an embodiment, the processor 211 may operate according to firmware provided for various operations of the memory system 200. In an embodiment, the processor 211 may perform a function of a flash translation layer (FTL) for performing garbage collection, address mapping, wear leveling, and the like for managing the memory device 220, a function of detecting and correcting an error of data read from the memory device 220, and the like.

The external device IF 213 may provide a communication channel for receiving a command and a dock signal from the external device 100 under the control of the processor 211, and controlling input/output of data. Particularly, the external device IF 213 may provide a physical connection between the external device 100 and the memory system 200. Furthermore, the external device IF 213 may provide interfacing with the memory system 200 corresponding to a bus format of the external device 100. The bus format of the external device 100 may include at least one of communication standards or interfaces such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-e or PCIe), and a universal flash storage (UFS).

The bus format of the external device 100 may further include at least one of a system management bus (SMBus), an inter-integrated circuit (I2C), and improved inter-integrated circuit (I3C) protocols.

The ROM 2151 may store program codes required for an operation of the memory controller 210, for example, firmware or software, code data used by the program codes, and the like.

The RAM 2153 may store data required for the operation of the memory controller 210, or data generated by the memory controller 210.

The MEMORY IF 217 may provide a communication channel for signal transmission/reception between the memory controller 210 and the memory device 220. The memory IF 217 may transfer data to be written to the memory device 220 or receive data read from the memory device 220, under the control of the processor 211.

The active die manager 30 may determine the optimum number of active dies on the basis of the number of dies associated with an open zone.

Specifically, the active die manager 30 may calculate the number of dies mapped to the open zone as the number of associated dies by referring to configuration information of each zone, and determine the optimum number of active dies by adjusting the maximum number of active dies according to the number of associated dies mapped to the zone.

Figure 6:
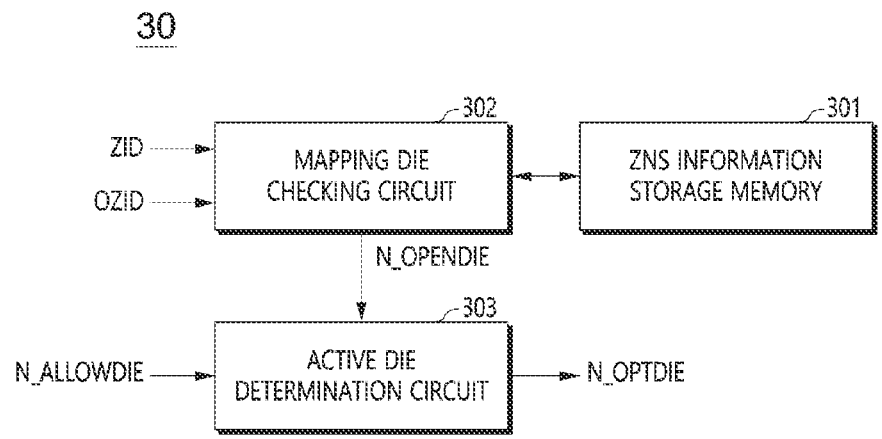
FIG. 6 is a configuration diagram of an active die manager in accordance with an embodiment of the present disclosure.

FIG. 6 is a configuration diagram of the active the manager in accordance with an embodiment of the present disclosure.

Referring to FIG. 6, the active die manager 30 in accordance with an embodiment may include a ZNS information storage memory 301, a mapping die checking circuit 302, and an active die determination circuit 303.

The ZNS information storage memory 300 may store configuration information of each zone generated according to a request of the external device 100. The configuration information of the zone may include a zone identifier ZID and the number of dies associated with or mapped to a corresponding zone.

The mapping die checking circuit 302 may detect the number of dies associated with a zone to be opened as "the number of to-be-opened zone-dies" as a zone open command including a zone identifier ZID is transmitted from the external device 100. Furthermore, on the basis of identifiers OZID of already-opened zones, the mapping die checking circuit 302 may detect the number of dies associated with an already-opened zone as "the number of already-opened zone-dies". The mapping die checking circuit 302 may output "the number of associated dies N_OPENDIE" by summing the number of to-be-opened zone-dies and the number of already-opened zone-dies.

The active die determination circuit 303 may determine the optimum number of active dies N_OPTDIE by adjusting the maximum number of allowed active dies N_ALLOWDIE on the basis of the number of associated dies N_OPENDIE.

In an embodiment, the active die determination circuit 303 may determine the optimum number of active dies N_OPTDIE mapped to the to-be-opened zone by adjusting the maximum number of allowed active dies N_ALLOWDIE mapped to the to-be-opened zone by the ratio of the number of associated dies N_OPENDIE mapped to the to-be-opened zone to the total number of dies N_TOTALDIE included in the memory device 220. For example, the active die determination circuit 303 may determine the optimum number of active dies N_OPTDIE mapped to the to-be-opened zone on the basis of Equation 2 below, but is not limited thereto.

$$N\_OPTDIE = N\_ALLOWDIE * (N\_OPENDIE / N\_TOTALDIE)$$ [Equation 2]

Figure 7:
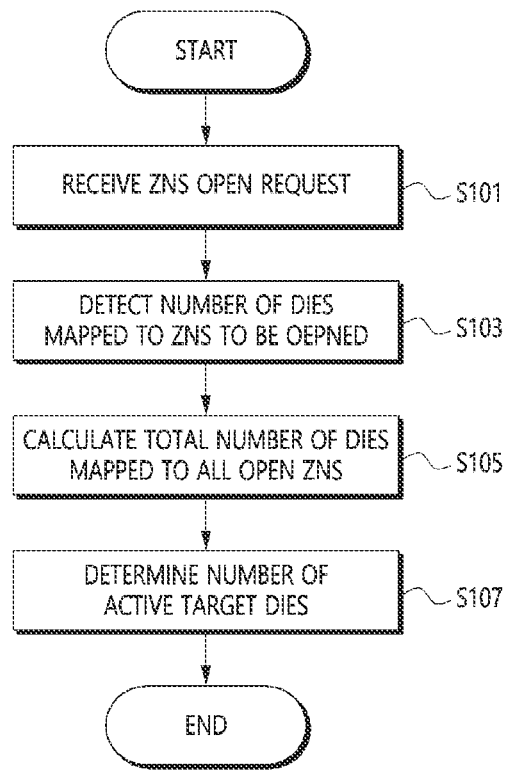
FIG. 7 is a flowchart for describing a method for operating a memory system in accordance with an embodiment of the present disclosure.

FIG. 7 is a flowchart for describing a method for operating the memory system 200 in accordance with an embodiment of the present disclosure, and specifically, a diagram for describing a method for determining the optimum number of active dies.

The memory controller 210 of the memory system 200 may generate zones according to a request of the external device 100, and store configuration information of each of the generated zones. The configuration information of a zone may include a zone identifier and the number of dies associated with or mapped to the zone.

In such a state, as a zone open command including a zone identifier is transmitted from the external device 100 (S101), the memory controller 210 may detect the number of dies associated with a zone to be opened as "the number of to-be-opened zone-dies" (S103).

On the basis of identifiers OZID of already-opened zones, the memory controller 210 may detect the number of dies associated with the already-opened zones as "the number of already-opened zone-dies", and calculate "the number of associated dies N_OPENDIE" by adding the number of to-be-opened zone-dies and the number of already-opened zone-dies (S105).

On the basis of the number of associated dies N_OPENDIE, the memory controller 210 may determine the number of active target dies, that is, the optimum number of active dies N_OPTDIE by adjusting the maximum number of allowed active dies N_ALLOWDIE (S107).

When an open zone does not use all dies in the memory system 200 operating based on the ZNS, that is, when all dies in the memory device 220 are not mapped to the open zone, even though the number of active dies is adaptively reduced according to the number of dies associated with the opened zone, performance of the memory system 200 required by the external device 100 may be satisfied.

For example, in relation to Equation 2 above, the maximum number of associated dies capable of satisfying the performance of the memory system 200 required by the external device 100 when the total number of dies N_TOTALDIE is 100 and the maximum number of allowed active dies N_ALLOWDIE is 20.

When the actual number of associated dies for an open zone is 50, even though the optimum number of active dies is limited to 10 (=20*(50/100)), the performance of the memory system 200 required by the external device 100 may be satisfied.

When the optimum number of active dies N_OPTDIE is determined to be 20 that is the maximum number of allowed active dies N_ALLOWDIE, 1/5 (=20/100) of the total number 100 of accessible dies is active. This is because, even when the optimum number of active dies N_OPTDIE is reduced to 10 (=20*(50/100)) according to the number 50 of associated dies N_OPENDIE, 1/5 (=10/50) of 50 open dies are active.

Accordingly, when the maximum number of allowed active dies N_ALLOWDIE is fixed in the ZNS environment, performance exceeding the required performance is exhibited depending on how many dies are associated with an open zone, which may cause unnecessary power consumption.

However, according to the present technology, the optimum number of active dies N_OPTDIE is dynamically determined according to the number of dies associated with an open zone, which makes it possible to optimize power consumption while providing required performance.

Figure 8:
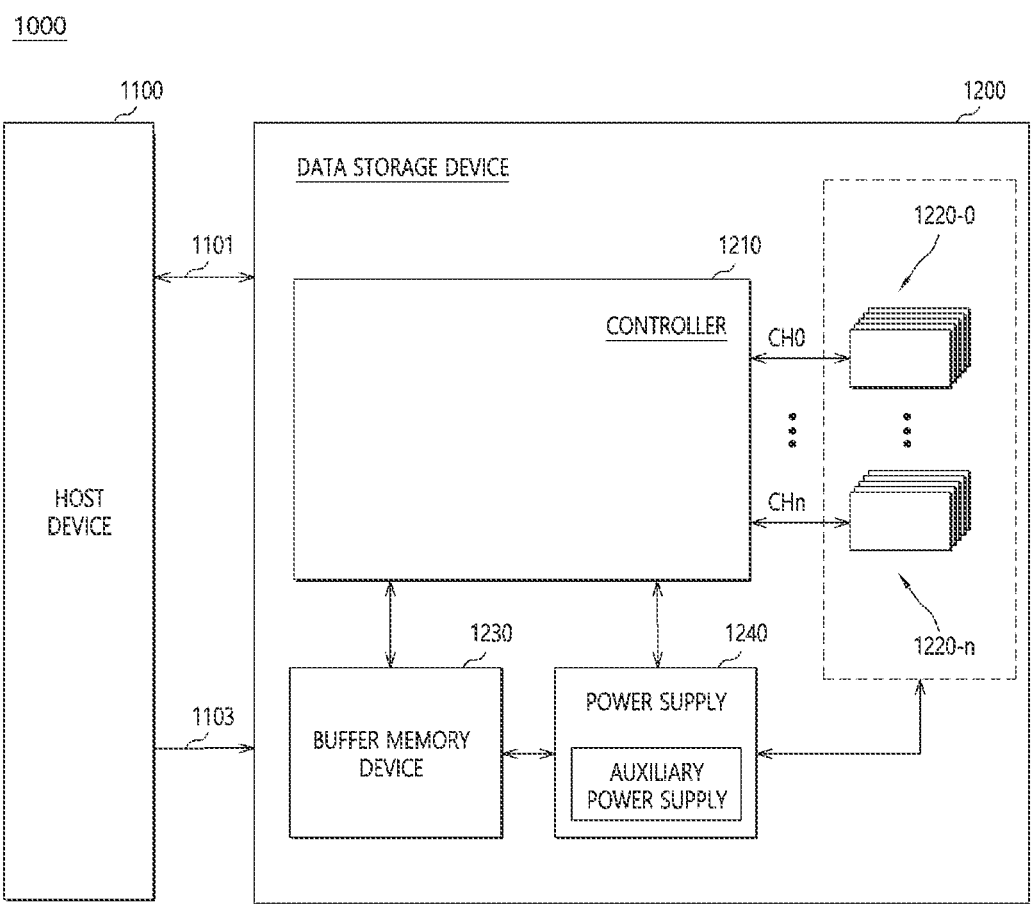
FIG. 8 is a diagram illustrating a data storage system in accordance with an embodiment of the present disclosure.

FIG. 8 is a diagram illustrating a data storage system 1000, in accordance with an embodiment of the present disclosure.

Referring to FIG. 8, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may be configured as controller 110 shown in FIGS. 5 and 6.

The host device 1100 may exchange a signal with the data storage device 1200 through the signal connector 1101. The signal may include a command, an address, data, and so forth.

The controller 1210 may analyze and process the signal received from the host device 1100. The controller 1210 may control 21) operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

Figure 9:
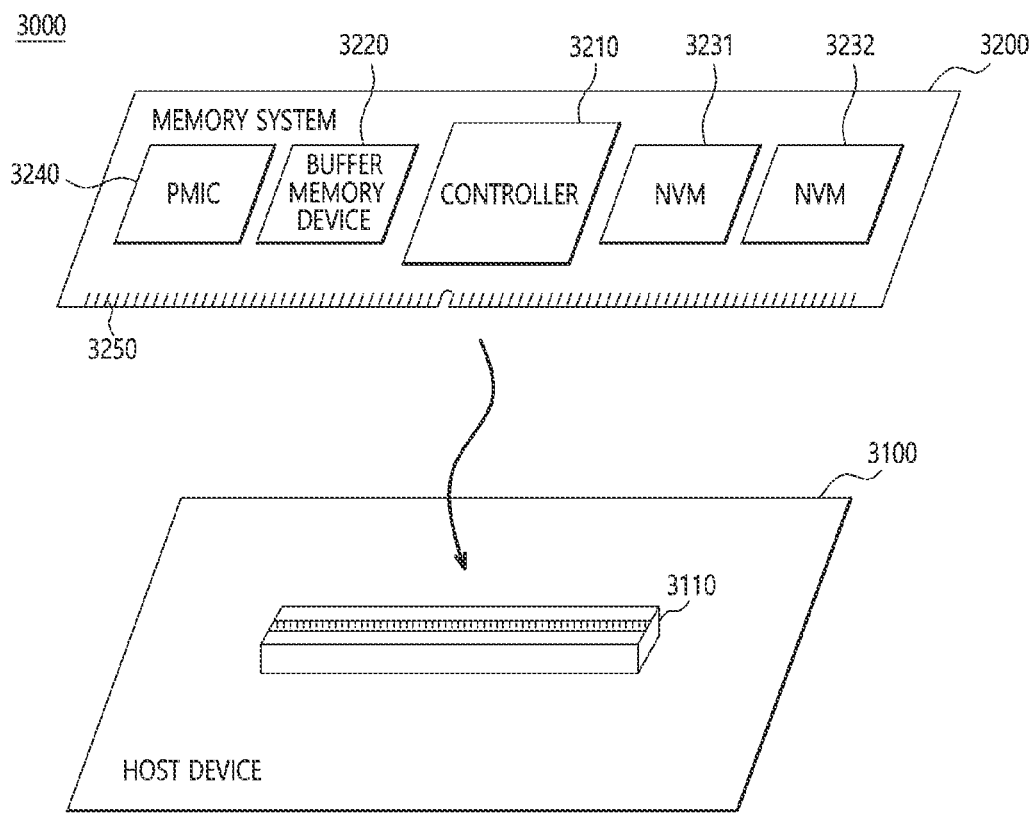
FIGS. 9 and 10 are diagrams illustrating a data processing system in accordance with an embodiment of the present disclosure.

The power connector 1103 may be configured as one or more of various types of connectors depending on a power supply scheme of the host device 1100, FIG. 9 is a diagram illustrating a data processing system 3000, in accordance with an embodiment of the present disclosure. Referring to FIG. 9, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200, The controller 3210 may be configured in the same manner as the controller 110 shown in FIGS. 5 and 6.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200, The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200.

Figure 10:
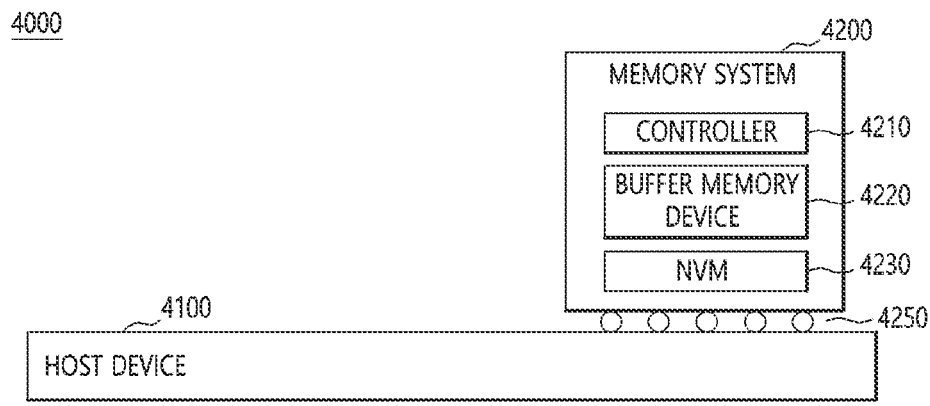

The connection terminal 3250 may be disposed on a side of the memory system 3200, as shown, FIG. 10 is a diagram illustrating a data processing system 4000 in accordance with an embodiment of the present disclosure, Referring to FIG. 10, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 5 and 6.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 11:
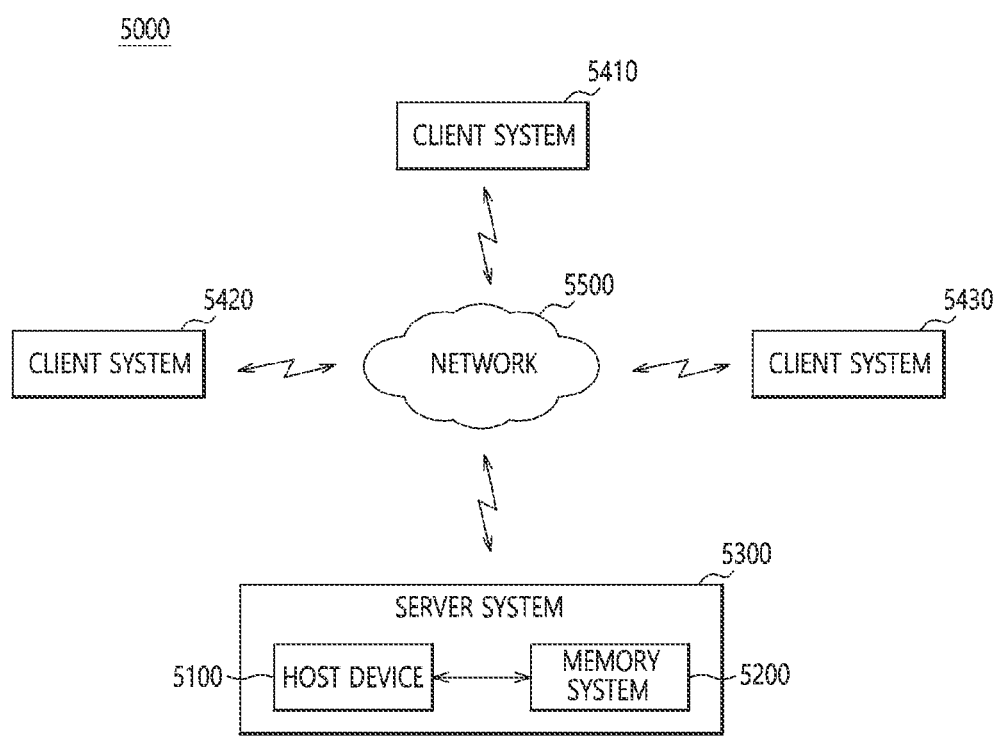
FIG. 11 is a diagram illustrating a network system including a data storage device in accordance with an embodiment of the present disclosure.

FIG. 11 is a diagram illustrating a network system 5000 including a data storage device, in accordance with an embodiment of the present disclosure. Referring to FIG. 11, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be include the memory controller 210 and memory device 220 shown in FIGS. 1 to 6.

Figure 12:
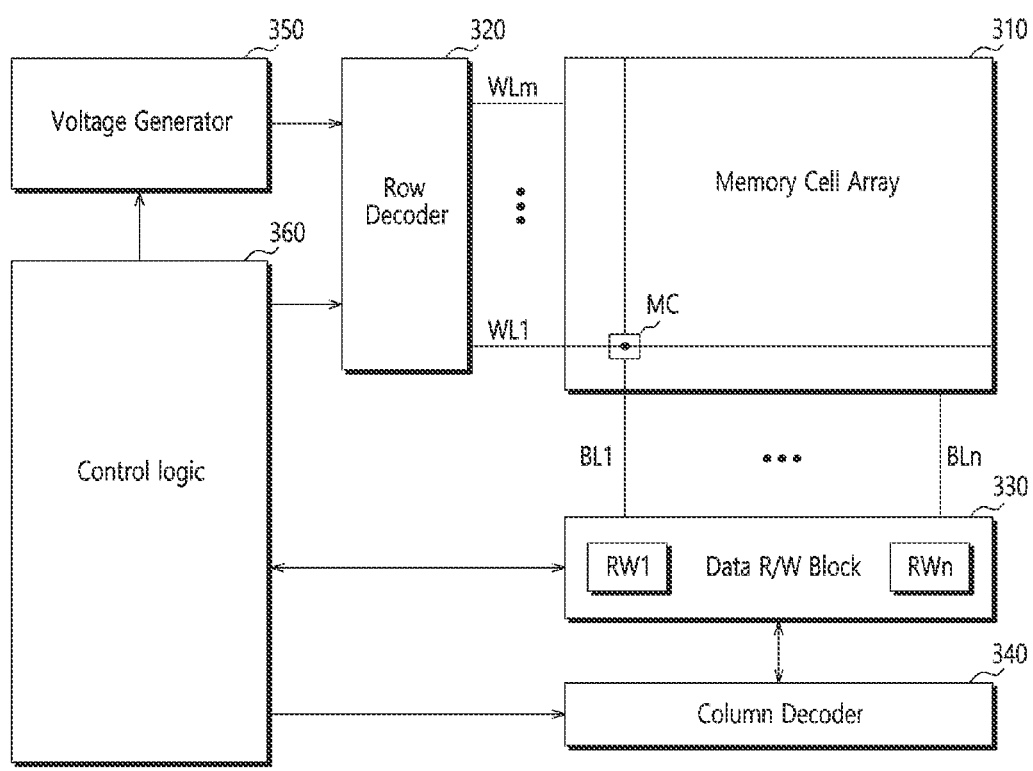
FIG. 12 is a block diagram illustrating a nonvolatile memory device included in a data storage device in accordance with an embodiment of the present disclosure.

FIG. 12 is a block diagram illustrating a nonvolatile memory device 300 included in a data storage device, such as the data storage device 10, in accordance with an embodiment of the present disclosure. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines MA to BLn intersect with each other.

The memory cell array 310 may comprise a three-dimensional memory array. The three-dimensional memory array, for example, has a stacked structure in a perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360, The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360, The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

The above-described embodiments of the present disclosure are intended to illustrate and not to limit embodiments of the present disclosure. Various alternatives and equivalents are possible. The invention is not limited by the embodiments described herein. Nor is the invention limited to any specific type of semiconductor device. Other additions, subtractions, or modifications are apparent in view of the present disclosure and are intended to fall within the scope of the appended claims. Furthermore, the embodiments may be combined to form additional embodiments,

What is claimed is:

1. A memory system comprising:
a memory device including a plurality of memory areas each configured by a plurality of memory blocks; and
a memory controller configured to generate zones each including at least one memory block selected from at least one of the memory areas included in the memory device,
manage configuration information for each zone,
sequentially store data into an open zone during a write operation on the open zone according to an external request, and
determine a number of active target memory areas associated with the open zone on a basis of configuration information of the open zone,
wherein the configuration information of the open zone includes a number of memory areas associated with the open zone, and
the memory controller is configured to determine the number of active target memory areas by adjusting a maximum number of active areas on a basis of the number of memory areas associated with the open zone.

2. The memory system according to claim 1,
wherein the memory controller is configured to determine the number of active target memory areas on a basis of a ratio of the number of memory areas associated with the open zone to a total number of the memory areas included in the memory device.

3. The memory system according to claim 1,
wherein the memory controller is configured to determine the number of active target memory areas by varying the maximum number of active areas on a basis of a ratio of the number of memory areas associated with the open zone to a total number of the memory areas included in the memory device.

4. A memory system comprising:
a memory device including a plurality of memory dies each including a plurality of memory blocks; and
a memory controller configured to generate a zone by grouping the memory blocks selected from at least one of the memory dies included in the memory device,
write, according to an external write request, data into an open zone, to which a write buffer is allocated, by simultaneously accessing memory dies associated with the open zone, and
determine a number of active target memory dies associated with the open zone on a basis of a number of the memory dies associated with the open zone,
wherein the memory controller is configured to determine the number of active target memory dies by adjusting a maximum number of active dies on a basis of the number of memory dies associated with the open zone.

5. The memory system according to claim 4, wherein the memory controller is configured to determine the number of active target memory dies on a basis of a ratio of the number of memory dies associated with the open zone to a total number of the memory dies included in the memory device.

6. The memory system according to claim 4, wherein the memory controller is configured to determine the number of active target memory dies by varying the maximum number of active dies on a basis of a ratio of the number of memory dies associated with the open zone to a total number of the memory dies included in the memory device.

7. The memory system according to claim 4, wherein the memory controller is further configured to generate a plurality of zones by grouping the same or a different number of memory blocks.

8. A method for operating a memory system, the method comprising:
- generating zones by grouping memory blocks selected from at least one of memory areas each configured by a plurality of memory blocks included in a memory device;
- managing configuration information for each zone; and
- determining a number of active target memory areas associated with an open zone on a basis of the configuration information of the open zone in order to perform a write operation on the open zone according to an external write request,
- wherein the configuration information of the open zone includes a number of memory areas associated with the open zone, and
- the determining comprises adjusting a maximum number of active areas on a basis of the number of memory areas associated with the open zone.

9. The method according to claim 8,
wherein the number of active target memory areas is determined on a basis of a ratio of the number of memory areas associated with the open zone to a total number of the memory areas included in the memory device.

10. The method according to claim 8,
wherein the determining comprises varying the maximum number of active areas on a basis of a ratio of the number of memory areas associated with the open zone to a total number of the memory areas included in the memory device.

* * * * *